Feb. 1, 1966   J. J. WILSON   3,232,351
LAWN EDGER
Filed April 9, 1964

INVENTOR.
JOHN J. WILSON
BY
Baldwin & Martin
ATTORNEYS

United States Patent Office 3,232,351
Patented Feb. 1, 1966

3,232,351
LAWN EDGER
John J. Wilson, 5256 Woodcrest Road, Jacksonville, Fla.
Filed Apr. 9, 1964, Ser. No. 358,505
10 Claims. (Cl. 172—18)

This invention relates to turf cutters and more particularly concerns lawn edging tools for cutting the turf adjacent sidewalks and the like.

A general object of this invention is to provide an improved lawn edger.

A particular object of this invention is the provision of an improved lawn edger which is adaptable to a variety of turf cutting practices by means of a construction enabling the user to vary the location of, as well as change or replace, operative elements of the edger to suit the particular requirements of the individual user and task.

A specific object of the invention is to provide an improved lawn edger in which the varying of location or changing or replacing of operative elements is simple and quick to accomplish and does not require the use of tools.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

Figures 1, 2, 3, 4, 5, 6:
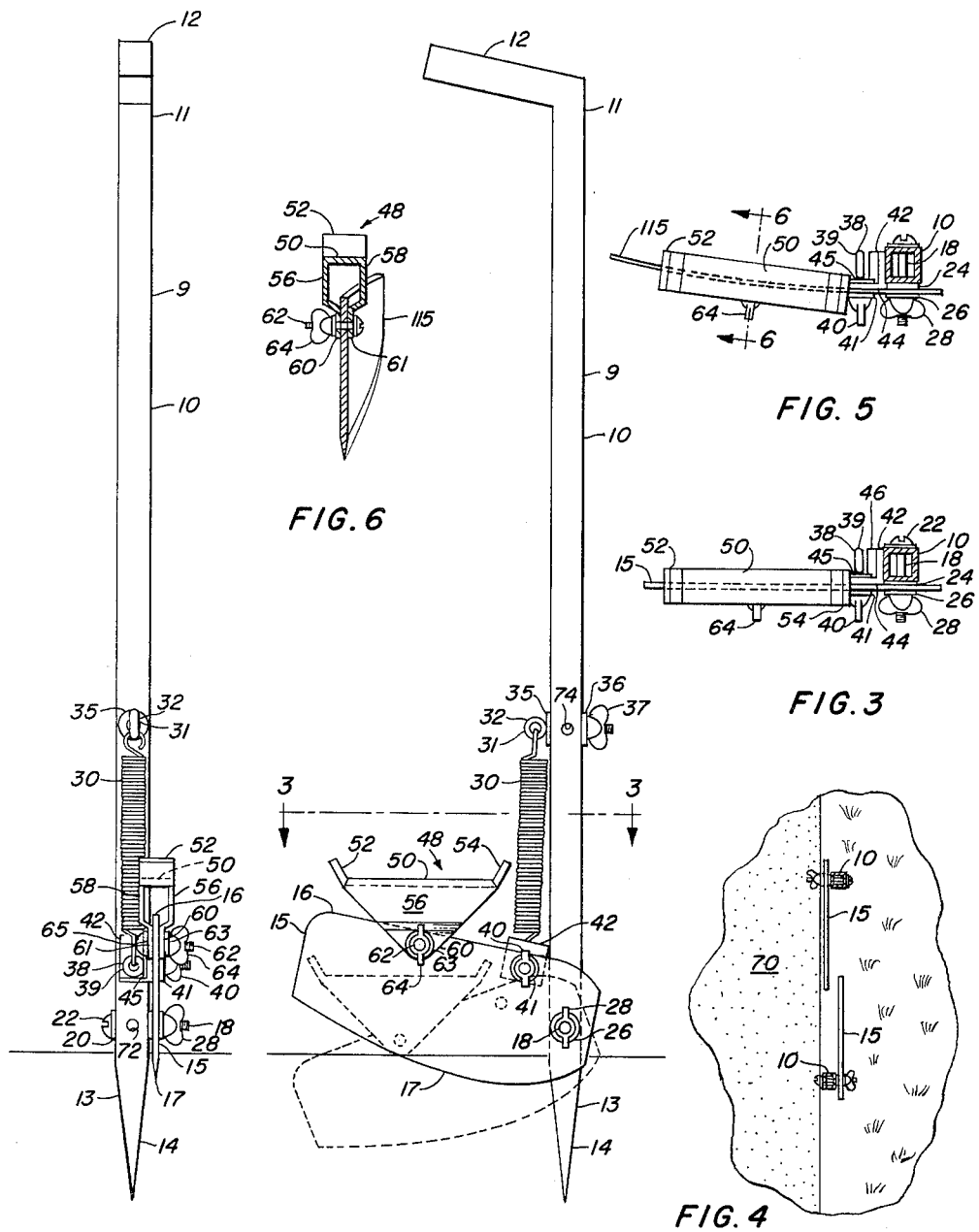
FIG. 1 is a side elevational view of a lawn edger constructed in accordance with the invention.
FIG. 2 is a front elevational view of the lawn edger of FIG. 1.
FIG. 3 is a cross-sectional view substantially along the line 3—3 of FIG. 2.
FIG. 4 is a generally diagrammatic view illustrating the use of the lawn edger of FIG. 1.
FIG. 5 is a cross-sectional view substantially similar to FIG. 3 with a curved blade having been substituted.
FIG. 6 is a cross-sectional view substantially along the line 6—6 of FIG. 5.

With reference to the drawing and particularly FIGS. 1-3, a lawn edger 9 constructed in accordance with this invention comprises an elongated handle or shaft 10 having a hand grip 12 at its upper end 11 and a pointed or tapered tip 14 at its lower end 13. The handle 12 is of hollow tubular construction, having in the specific embodiment shown, a square cross-section. The grip 12 is preferably integral with the handle 10 although the grip may be initially formed separately and later joined to the handle. The grip 12 extends at a very substantial angle to the longitudinal axis of the handle 10, so that with the handle in a vertically extending position, the grip will extend generally horizontally. The handle 10 may be formed from any suitable material, such as sheet metal or a plastic. When the handle 10 is formed from a plastic material, the tip 14 is preferably a separate metal member in order to provide the tip with a hardness and durability not usually found in plastics.

A metal blade 15 is pivotally mounted at one end on the handle 10 adjacent the tip 14. The blade 15 is generally rectangular in plan having a straight upper edge 16 and a curved, sharpened lower edge 17. The blade 15 is mounted on the handle 10 by means of a bolt 18 which extends laterally, or diametrically, through the handle being received freely in openings in opposite walls or sides of the handle 10. A washer 20 is disposed between the handle 10 and the head 22 of the bolt 18. Another washer 24 is disposed between the handle 10 and blade 15, and a third washer 26 is disposed between the blade and a wing nut 28 threadably engaged with the end of the bolt 18 opposite the bolt head so as to retain the blade on the bolt and the bolt in the handle.

The blade 15 is urged upwardly by a tension coil spring 30 which extends generally parallel to the handle 10. The upper end of the spring 30 is connected to the eye 31 of an eyebolt 32. The eyebolt 32 extends at right angles to the bolt 18 and diametrically of the handle 10 through aligned openings in opposite walls or sides of the handle with said openings being spaced vertically above the openings receiving the bolt 18. The end of the eyebolt 32 opposite the eye 31 is threadably engaged by a wing nut 34 to retain the eyebolt on the handle 10. A pair of washers 34 and 36 are disposed respectively between the eye 31 of the eyebolt 32 and the handle 10 and between the handle 10 and wing nut 37. The lower end of the spring 30 is connected to the eye 39 of a second eyebolt 38 carried by the blade 15 and extending parallel to the bolt 18. As most clearly shown in FIGS. 2 and 3, the bolt 38 extends through an opening in the blade 15. A wing nut 40 is threadably engaged with the end of the bolt 38 opposite the eye 39, with a washer 41 being disposed between the wing nut and blade. Accordingly, the blade 15 is urged upwardly, or in a clockwise direction as viewed in FIG. 2 about the pivot formed by the bolt 18.

Upward pivotal movement of the blade 15 is limited by a stop member 42 which is clamped to the blade. More specifically, the stop 42 is L-shaped and as shown in FIG. 3 has a leg 44 which lies alongside the blade 15 and has an opening through which the bolt 38 extends. A washer 45 is disposed between the leg 44 of the stop 42 and the eye 39 of the bolt 38. The stop 42 has a second leg 46 extending generally at right angles to the leg 44 and the longitudinal centerline of the blade 15. Accordingly, and as can be seen from FIG. 2, the upper outer edge of the leg 46 is engageable with the handle 10 to limit upward movement of the blade. Due to the spacing of the bolt 38 upwardly of the blade pivot bolt 18, when the blade 15 is moved downwardly over its normal range of travel, the stop 42 will move outwardly away from the handle 10 so as not to interfere with downward pivoting of the blade.

In order to facilitate downward pivoting of the blade 15, a foot rest 48 is pivotally mounted on the blade. The foot rest 48 comprises a rectangular upwardly facing treadle or plate 50 which extends generally longitudinally of the blade 15 and has its ends upturned to provide a pair of guards 52 and 54. The plate 50 has a pair of integral spaced apart, depending sides 56 and 58 of generally triangular configuration, the plate 50 is very substantially wider than the blade 16 is thick in order to provide a firm and comfortable foot rest. As can be seen in FIG. 1, the sides 56 and 58 of the foot rest depend from the opposite longitudinal edges of the plate 50 in parallel relation so that at their upper ends they are spaced substantially from the sides of the blade 15. At their lower ends, the sides 56, 58 of the foot rest are redirected inwardly toward the blade 15 and then downwardly generally parallel to the blade and upper portion of the sides to provide a pair of offset parallel legs 60, 61 which embrace the blade 15 adjacent the top edge 16 of the blade so as to be engaged with opposite sides of the blade. The foot rest 48 is pivotally mounted on the blade 15 by a bolt 62 which extends freely through aligned apertures in the legs 61 and 62 and blade 15. A washer 63 is disposed between the leg 61 and head of the bolt 62, and another washer 65 is disposed next adjacent the outer surface of the leg 60. A wing nut 64 engaged over the unheaded end of the bolt 62 retains the elements mounted on the bolt in assembly.

In the use of the lawn edger just described the tip 14 of the handle 10 is firmly implanted into the ground using the grip 12 to guide the handle and exert a downward force thereon. The user after inserting the handle 10 the desired distance into the ground, places one foot on the foot rest 48 and presses downwardly to force the blade 15 into the ground to a depth desired. The curved sharpened edge of the blade facilitates the cutting action and reduces the effort required from the user. The guards 52 and 54 on the foot rest 48 prevent the user's foot from slipping off the ends of the treadle 50 and also, by engagement with the sides of the user's shoe facilitates pivoting of the foot rest so that the treadle is maintained horizontal during the pivoting of the blade 15, as shown in broken lines in FIG. 2. As the blade 15 is forced downwardly the spring 30 will be tensioned. When the user lifts his foot from the foot rest 48, or releases pressure thereon, the spring 30 will automatically retract the blade 15 until the stop 42 engages the handle 10, whereupon the blade is in position for another cutting stroke after repositioning of the lawn edging tool 9. In this last connection it is preferred that the spring 30 be at least slightly preloaded when the blade 15 is in the full line, retracted position of FIG. 2 to assure automatic return of the blade to this position and to prevent the blade from pivoting when the lawn edging tool 9 is carried from place to place.

The lawn edger 9 of FIGS. 1–3 can be used generally wherever it is desired to cut a straight line in the turf. However, it is particularly useful in cutting along a sidewalk or the like. For example, and as illustrated in FIG. 4 the lawn edger 9 may be positioned as shown in the upper portion of FIG. 4 with the blade 15 lying next adjacent a sidewalk 70, so that on depression of the blade, the blade will pass alongside the sidewalk. If desired to provide a cut farther away from the sidewalk, the lawn edger 9 may be reversed, as shown in the lower portion of FIG. 4, to locate the side of the handle 10 opposite the blade 15 so that it is next adjacent the sidewalk 70. Further, versatility of the lawn edger 9 is provided by means whereby the blade 15 may be easily relocated relative to the grip 12 so that the blade 15 will extend generally at right angles to the grip rather than generally parallel thereto as shown in FIGS. 1 and 2. More particularly and with reference to FIG. 1 the handle 10 is provided with a second pair of aligned openings 72 (only one of which is shown) on opposite sides of the handle and having an axis extending at right angles to and intersecting the openings through which the bolt 18 extends in FIG. 1. Also, and as shown in FIG. 2, the handle 10 is also provided with a pair of openings 74 (only one of which is shown) on opposite sides of the handle and having an axis extending at right angles to and intersecting the axis of the openings receiving the eyebolt 32 in FIG. 2. Where the user finds it more convenient or comfortable to use the lawn edger 9 with the blade 15 extending at right angles to the grip 12, the wing nuts 28 and 36 may be removed, by hand, from the bolts 18 and 32, respectively, and the bolts removed from the handle 19 and relocated in the openings 72 and 74, respectively, with the various washers and blade being remounted on the bolts. The wing nuts 28 and 36 are then placed back on the bolts 18 and 32 and tightened by hand. Also, if desired, the blade 15 may be relocated so as to extend from the side of the handle 10 opposite the grip 12 rather than underlying the grip as in FIG. 2. In this case the bolt 18 could remain in the position shown in FIG. 2 and the blade 15 merely turned 180 degrees and remounted on the bolt 18. However, the eye bolt 32 would have to be reversed in the openings in which it is received in FIG. 2 so that the spring 30 could be located on the opposite side of the handle 10. Also, as will be apparent, with the blade 15 mounted so as to extend at right angles to the grip 12, the blade may be mounted so as to extend either to the right or left, as viewed in FIG. 1. The use of bolts and wing nuts to mount the blade 15 and upper end of the spring 30 greatly facilitates relocation of the blade and eliminates the necessity of using tools, special or otherwise, for this purpose. In a like manner, the use of bolts and wing nuts to connect the lower end of the spring 30 to the blade 15 and to mount the foot rest 48 on the blade greatly facilitates changing of the blade or removal of the blade for sharpening.

In the interest of further versatility, the lawn edger 9 may be used with a curved blade 115 such as shown in FIGS. 5 and 6. Here the blade 115 is mounted on the handle 10, connected to the spring 30 and carries the foot rest 48 in the same manner as the blade 15 previously described. However, the blade 115, instead of being straight or flat, is curved about an axis extending parallel to the handle 10. The curved blade 115 is very useful in trimming around shrubbery or trees, and a radius of curvature of the blade of approximately 40 inches has been found to be generally suitable. The curvature of the blade 115 may require the legs 60, 61 of the foot rest 48 to be spread apart slightly in order to fit over the blade. The material and thickness of the sides 56, 58 of the foot rest are therefore selected to provide the sides 56, 58 with the necessary flexibility. The blade 115 may be mounted in the variety of manners described in connection with the blade 15.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A lawn edger comprising an elongated handle having a laterally extending hand grip adjacent one end thereof, a blade, means for pivotally mounting said blade on said handle adjacent the other end thereof in a selected one of a plurality of positions spaced angularly about the longitudinal axis of said handle for movement about a selected one of a plurality of axes extending at right angles to said longitudinal axis, a tension coil spring providing automatic retraction of said blade, said spring being connected at one end to said blade and extending generally along said handle, and means for connecting the other end of said spring to said handle in a selected one of a plurality of positions spaced angularly about said longitudinal axis and respectively corresponding to the first mentioned plurality of positions.

2. A lawn edger comprising a vertically extending handle having an angularly extending hand grip adjacent the upper end thereof, a blade, means for pivotally mounting said blade on said handle adjacent the lower end thereof in a selected one of a plurality of positions spaced angularly about the longitudinal axis of said handle for movement about a selected one of a plurality of axes extending at right angles to said longitudinal axis, a tension coil spring urging said blade upwardly, one end of said spring being connected to said blade, and means for connecting the other end of said spring to said handle in a selected one of a plurality of positions spaced vertically above said blade and angularly about said longitudinal axis and respectively corresponding to the first mentioned plurality of positions, said means for mounting said blade on and connecting the other end of said spring to said handle each providing quick disassembly and reassembly of said blade, spring and handle without the use of tools.

3. A lawn edger comprising an elongated vertically extending handle, a blade, means pivotally mounting one end of said blade on said handle adjacent one end thereof including a horizontally extending bolt extending through openings in said blade and handle and a wing nut engaged with said bolt, a tension coil spring connected at one end to said blade and extending upwardly and generally along said handle, means for connecting the other end of said spring to said handle including a horizontally extending bolt extending through said handle and a wing nut on said bolt, means providing a foot rest on said blade, and means providing additional openings in said handle for receiving said bolts mounting said blade on and connecting the other end of said spring to said handle, each of said additional openings respectively associated with each said bolt being spaced angularly about the longitudinal axis of said handle from each said bolt and having axes extending at right angles to said longitudinal axis.

4. In a lawn edger, an elongated handle, a blade having a lower cutting edge and an upper edge, said blade being pivotally mounted at one end on said handle adjacent one end thereof for movement about a pivot axis extending at right angles to the longitudinal axis of said handle, a spring connected between said blade and handle and urging the other end of said blade toward the other end of said handle, a foot rest including a treadle portion overlying said upper edge of said blade in spaced relation, a pair of integral sides depending from said treadle portion in outwardly spaced relation to the opposite sides of said blade and terminating in a pair of offset leg portions disposed closely adjacent said opposite blade sides, means detachably mounting said leg portions on said blade adjacent said upper edge thereof for pivotal movement of said foot rest about an axis extending generally in the direction of the pivot axis of said blade, and a pair of guard members integral with said treadle portion and extending upwardly from the opposite ends respectively of said treadle portion.

5. A lawn edger comprising a vertically extending handle, a blade having a lower cutting edge and an upper edge, quick detachable means mounting one end of said blade on said handle in a selected one of a plurality of positions spaced angularly about the longitudinal axis of said handle for vertical pivoting of said blade, a stop member for engagement with said handle to limit upward pivoting of said blade, a tension coil spring for urging said blade upwardly, quick detachable means mounting said stop member and one end of said spring on said blade, quick detachable means connecting the other end of said spring to said blade in a selected one of a plurality of positions spaced angularly about the longitudinal axis of said handle, a foot rest including a treadle portion overlying said upper edge of said blade in spaced relation thereto, and quick detachable means mounting said foot rest on said blade for pivotal movement about an axis extending generally at right angles to the general plane of said blade.

6. A lawn edger comprising an elongated vertically extending handle having a generally horizontally extending hand grip at one end and a pointed tip at its other end, a turf cutting blade, a first bolt extending through one end of said blade and through said handle adjacent said other end thereof and pivotally mounting said blade on said handle, a wing nut on said first bolt, a washer on said first bolt and disposed between said blade and handle, a second bolt extending through said handle at right angles to and spaced vertically above said first bolt, a wing nut on said second bolt, a third bolt extending through said blade intermediate said first bolt and the other end of said blade and extending parallel to and spaced vertically above said first bolt, a preloaded tension coil spring connected between said second and third bolts, an L-shaped stop having a first leg mounted on said third bolt and clamped to said blade and a second leg extending generally at right angles to said blade and engaged with said handle to limit upward pivoting of said blade, a wing nut on said third bolt, a foot rest pivotally mounted on said blade and comprising a treadle portion with integral sides depending therefrom and having upturned integral end portions forming foot guards, said sides of said foot rest being disposed on opposite sides of said blade, a fourth bolt passing through said opposite sides of said foot rest and blade, a pair of washers on said fourth bolt respectively disposed adjacent said opposite sides of said foot rest, a wing nut on said fourth bolt, and means providing additional openings in said handle for receiving said first and second bolts, said additional openings being spaced angularly about the longitudinal axis of said handle from the openings receiving said first and second bolts.

7. A lawn edger as described in claim 6 in which said opposite sides of said foot rest and blade, a pair of washers from said treadle in outwardly spaced relation to the opposite sides of said blade and each terminate in a leg portion offset toward the other side of said foot rest and disposed closely adjacent the next adjacent side of said blade, said fourth bolt passing through said leg portions, said blade being curved about an axis extending parallel to said handle.

8. A lawn edger comprising an elongated handle having an angularly extending hand grip at its upper end and a pointed turf penetrating lower end, a planar blade having a sharpened lower edge and an upper edge, pivot means for mounting said blade to said handle adjacent said lower end thereof for pivotal movement about an axis extending at right angles to the longitudinal axis of said handle, a foot rest having a pair of spaced side portions respectively adjacent the opposite sides of said blade, means mounting said side portions to said blade adjacent said upper edge thereof for pivotal movement of said foot rest about an axis extending generally in the direction of the pivot axis of said blade, and a spring having one end connected to said blade generally between said means for mounting said blade to said handle and said means mounting said side portions to said blade and having its other end connected to said handle spacedly above said lower end thereof.

9. A lawn edger comprising an elongated handle having a grip at its upper end extending laterally of said handle and a pointed turf penetrating lower end, a curved blade having a sharpened lower edge and an upper edge, means for pivotally mounting said blade to said handle adjacent said lower end thereof for movement about an axis extending at right angles to the longitudinal axis of said handle, a foot rest having a treadle portion and a pair of depending spaced side portions therefrom, said side portions being outwardly spaced from respective opposite sides of said blade adjacent said treadle portion, each said side portion terminating in a leg portion offset toward the other side portion of said foot rest and disposed closely adjacent a respective side of said blade, means mounting said leg portions to said blade adjacent said upper edge thereof for pivotal movement of said foot rest about an axis extending generally in the direction of the pivot axis of said blade, and a spring having one end connected to said blade generally between said pivot means for mounting said blade to said handle and said means mounting said leg portions to said blade and having its other end connected to said handle spacedly above said lower end thereof.

10. Lawn edger means comprising, in combination, an elongated handle, a planar first blade having a lower sharpened edge and an upper edge, a curved second blade having a lower sharpened edge and an upper edge, quick detachable means for alternatively mounting one end of the first and second blades on said handle adjacent one end thereof for pivotal movement about a selected one of a plurality of axes extending at right angles to the longitudinal axis of said handle and spaced angularly about said longitudinal axis, means for urging the blade mounted on said handle in one direction about its pivotal axis, a foot rest, and quick detachable means for alternatively pivotally mounting said foot rest on said first and second blades for movement about an axis extending generally at right angles to the general plane of the blade and disposed between the upper and lower edge of the blade.

References Cited by the Examiner
UNITED STATES PATENTS

| | | | |
|---|---|---|---|
| 463,806 | 11/1891 | Bird | 30—315 |
| 1,070,766 | 8/1913 | Braun | 172—372 |
| 1,251,059 | 12/1917 | Larson | 172—25 |
| 1,537,537 | 5/1925 | Liebscher | 172—18 |
| 2,568,468 | 9/1951 | Smith | 172—17 |
| 2,764,926 | 10/1956 | Heimbigner | 172—18 |

FOREIGN PATENTS

| | | |
|---|---|---|
| 859,863 | 1/1961 | Great Britain. |
| 217,405 | 2/1942 | Switzerland. |

ABRAHAM G. STONE, *Primary Examiner.*

UNITED STATES PATENT OFFICE
CERTIFICATE OF CORRECTION

Patent No. 3,232,351　　　　　　　　　　　　　February 1, 1966

John J. Wilson

It is hereby certified that error appears in the above numbered patent requiring correction and that the said Letters Patent should read as corrected below.

Column 6, line 13, for "and blade, a pair of washers" read -- extend downwardly --.

Signed and sealed this 13th day of December 1966.

(SEAL)
Attest:

ERNEST W. SWIDER　　　　　　　　　　　　EDWARD J. BRENNEI
Attesting Officer　　　　　　　　　　　　Commissioner of Patents